(12) United States Patent
Huang et al.

(10) Patent No.: US 11,037,340 B2
(45) Date of Patent: Jun. 15, 2021

(54) AUTOMATIC OBSTACLE AVOIDANCE OPTIMIZATION METHOD FOR CONNECTING LINE OF GRAPHICAL PROGRAMMING SOFTWARE

(71) Applicant: South China University of Technology, Guangzhou (CN)

(72) Inventors: Han Huang, Guangzhou (CN); Hongyue Wu, Guangzhou (CN); Zhifeng Hao, Guangzhou (CN); Xiaowei Yamg, Guangzhou (CN)

(73) Assignee: South China University of Technology, Guangdong (CN)

( * ) Notice: Subject to any disclaimer, the term of this patent is extended or adjusted under 35 U.S.C. 154(b) by 0 days.

(21) Appl. No.: 16/607,106

(22) PCT Filed: Nov. 15, 2017

(86) PCT No.: PCT/CN2017/111156
§ 371 (c)(1),
(2) Date: Oct. 22, 2019

(87) PCT Pub. No.: WO2018/192216
PCT Pub. Date: Oct. 25, 2018

(65) Prior Publication Data
US 2020/0286268 A1    Sep. 10, 2020

(30) Foreign Application Priority Data

Apr. 22, 2017 (CN) .......................... 201710268387.2

(51) Int. Cl.
*G06T 11/20* (2006.01)
*G06F 8/34* (2018.01)
(52) U.S. Cl.
CPC .............. *G06T 11/203* (2013.01); *G06F 8/34* (2013.01); *G06T 2210/21* (2013.01)

(58) Field of Classification Search
CPC ....... G06T 11/40; G06T 11/203; G06T 17/00; G06T 11/001; G06T 11/00
(Continued)

(56) References Cited

U.S. PATENT DOCUMENTS

| 6,167,332 A | 12/2000 | Kurtzberg et al. |
| 2005/0192749 A1* | 9/2005 | Flann ................... G01C 21/005 701/301 |
| 2010/0211244 A1* | 8/2010 | Jeong ................... G06T 19/003 701/25 |

FOREIGN PATENT DOCUMENTS

| CN | 101900570 | 12/2010 |
| CN | 101957876 | 1/2011 |

(Continued)

OTHER PUBLICATIONS

International Search Report and the Written Opinion dated Feb. 23, 2019 From the International Searching Authority Re. Application No. PCT/CN2017/111156 and Its Translation of Search Report Into English. (10 Pages).

*Primary Examiner* — Gordon G Liu
(74) *Attorney, Agent, or Firm* — JCIPRNET

(57) ABSTRACT

Disclosed is an automatic obstacle avoidance optimization method for a connecting line of graphical programming software. A breadth-first search method is adopted to search an optimal connecting line path, and a result is displayed in a front-end interface. In a generated connecting line, a user can drag the connecting line with a mouse to regulate a position of the connecting line. At the time, the mouse is viewed as an unavoidable point, that is, the connecting line starts from a starting point of the connecting line to the unavoidable point and then reaches an end point of the connecting line. By means of the method, high instantaneity requirements of the user can be met, and when the user drags the connecting line with the mouse, a new connecting line is (Continued)

generated in real time without a stuck phenomenon. In addition, the optimality of the connecting line can be guaranteed, when a scene of a front-end programming control is changed, the connecting line can generate a new connecting line path according to a new scene in real time, and the optimality is kept.

5 Claims, 1 Drawing Sheet

(58) Field of Classification Search
USPC .......................................................... 345/441
See application file for complete search history.

(56) References Cited

FOREIGN PATENT DOCUMENTS

| | | |
|---|---|---|
| CN | 106441303 | 2/2017 |
| CN | 107168697 | 9/2017 |
| WO | WO 2018/192216 | 10/2018 |

* cited by examiner

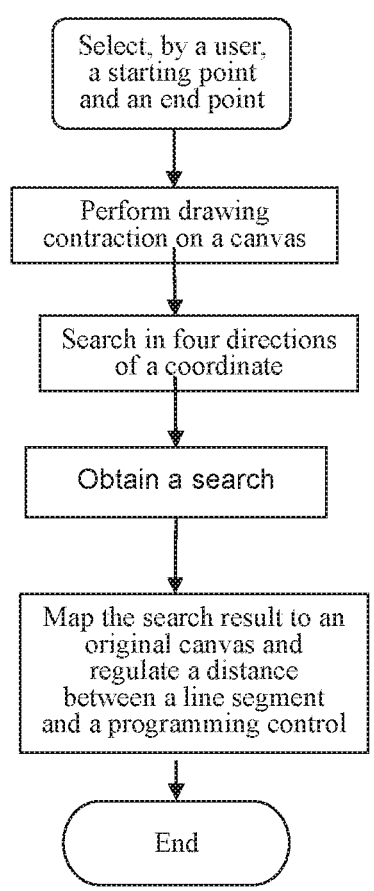

AUTOMATIC OBSTACLE AVOIDANCE OPTIMIZATION METHOD FOR CONNECTING LINE OF GRAPHICAL PROGRAMMING SOFTWARE

RELATED APPLICATIONS

This application is a National Phase of PCT Patent Application No. PCT/CN2017/111156 having International filing date of Nov. 15, 2017, which claims the benefit of priority of Chinese Patent Application No. 201710268387.2 filed on Apr. 22, 2017. The contents of the above applications are all incorporated by reference as if fully set forth herein in their entirety.

FIELD AND BACKGROUND OF THE INVENTION

The present invention generally relates to the field of a front-end connecting line of software, and more particularly, to an automatic obstacle avoidance optimization method for a connecting line of graphical programming software.

In recent years, with a front-end interface of software becoming more and more complex, users can operate more and more programming controls, and in order to prevent the display of the front-end interface from being too messy, obstacle avoidance is particularly important in the display of the front-end interface. Connecting line obstacle avoidance is an important part of the obstacle avoidance. The connecting line obstacle avoidance is widely applied in all aspects of production and life, and whether in a web page or in a client, as long as a connecting line is involved, the connecting line obstacle avoidance can be basically involved. Moreover, clients ask for increasingly higher instantaneity on line connection operation currently, and every response shall be in a millisecond level. Therefore, drawing contraction is particularly important in a huge front-end interface of a canvas. Without drawing contraction, a solution space is too large to meet instantaneity requirements. However, there are a large number of equivalence points in the solution space based on the connecting line. Therefore, it is a good choice to preprocess the canvas by drawing contraction.

SUMMARY OF THE INVENTION

For an obstacle avoidance problem on a front-end connecting line of software, the present invention provides an automatic obstacle avoidance optimization method for a connecting line of graphical programming software. The present invention is intended to rapidly plan an optimal solution for the front-end connecting line of the software under the condition of meeting high instantaneity requirements of users. The specific technical solution is as follows.

An automatic obstacle avoidance optimization method for a connecting line of graphical programming software comprises the following steps of:

(a) selecting, by a user, a starting point and an end point of a connecting line through a front-end interface, wherein the starting point, the end point and a vertex of a programming control form a point set P, abscissa values in P form a set $P_x$, and ordinate values form a set $P_y$;

(b) performing drawing contraction on a canvas: taking continuous abscissa values not belonging to $P_x$ as an equivalent abscissa, and similarly, taking continuous ordinate values not belonging to $P_y$ as an equivalent ordinate, wherein, in the canvas after drawing contraction, the equivalent coordinate values are taken as the same coordinate, which greatly reduces a search space, and the operation establishes a mapping relationship between the coordinate values in the original canvas and the canvas after drawing contraction;

(c) searching the canvas after drawing contraction in four directions of the coordinate, and recording a search source of each point for restoring a path;

(d) restoring the search path according to the search source to obtain a search result which is namely a connecting line;

(e) mapping the search result obtained in the step (d) to the original canvas; and (f) regulating the connecting line obtained in the step (e): performing translational regulation on each line segment in a vertical direction thereof to regulate a distance between the line segment and the programming control.

Further, according to the automatic obstacle avoidance optimization method for a connecting line of graphical programming software above, the step (b) comprises the following steps of:

(b-1) analyzing all programming controls, starting points and end points, and extracting all abscissa values X and all ordinate values Y;

(b-2) respectively sorting X and Y according to a magnitude to obtain X and Y sorted from small to large;

(b-3) mapping an X' and a Y' for each X and Y, X' and Y' respectively representing coordinate values of X and Y in the canvas after drawing contraction, and establishing a mapping relationship between X and X' and between Y and Y';

(b-4) if $X_{i+1}-X_1>1$ in X, inserting an $X_{i+1}$ between $X_{i+1}$ and $X_i$, and processing Y in the same way; and (b-5) mapping an X'(Y') for each X(Y), and establishing a mapping relationship.

Further, according to the automatic obstacle avoidance optimization method for a connecting line of graphical programming software above, in the step (c), a range of a new canvas, mapping relationships of the starting point and the end point on the new canvas, and a mapping relationship of each vertex of each rectangle on the new canvas can be obtained through the step (b). The new canvas can be obtained through the range and the mapping relationships. Searching will be carried out in the canvas after drawing contraction in the step (c), which comprises:

(c-1) initializing an empty queue Q;

(c-2) placing the starting point in Q and marking the starting point as an accessed point; and (c-3) taking out a head element p from Q every time, and searching in an x positive direction, an x negative direction, a y positive direction and a y negative direction of the element p; inserting a searched point into the queue from an end of the queue, and when a point p' is searched every time, marking p' as an accessed point and recording a search source of p' as p; and once the search in each direction encounters an obstacle or the accessed point, stopping the search in the direction.

Further, according to the automatic obstacle avoidance optimization method for a connecting line of graphical programming software above, in the step (d), the end point of the connecting line can be finally searched through the method above, and the search is finished at the time. A connecting line path is constructed according to the search source of each point, and the connecting line path is the optimal connecting line path after drawing contraction.

Further, according to the automatic obstacle avoidance optimization method for a connecting line of graphical programming software above, the search result in the step (d) is saved in a form of an ordered point set, and all inflection points (comprising the starting point and the end point) are sequentially saved in the point set from the starting point to the end point.

Further, according to the automatic obstacle avoidance optimization method for a connecting line of graphical programming software above, in the step (e), the search result is restored to the original canvas according to the mapping relationship obtained in the step (b), which is namely restoring each point in the ordered point set in the step (d) to the point in the original canvas according to the mapping relationship.

Further, according to the automatic obstacle avoidance optimization method for a connecting line of graphical programming software above, the operation of the step (f) is performed on each line segment excluding the starting point and the end point, which specifically comprises: using a bisection method to find the programming controls closest to the line segment on the two sides of the line segment, preprocessing firstly by dividing all rectangular edges into two groups, one group being parallel to an x coordinate axis and recorded as a first group, and the other group being parallel to a y coordinate axis and recorded as a second group; sorting the two groups of edges respectively, sorting the first group according to y coordinate values of the edges from small to large, and sorting the second group according to x coordinate values of the edges from small to large; and for one line segment, finding programming controls closest to the line segment on two sides of the line segment, which can be then converted to find edges of the programming controls closest to the line segment on the two sides, so that quick finding can be implemented in the sorted edges by using the bisection method.

Compared with the prior art, the present invention has the following advantages and technical effects.

The current visual programming software has a large number of controls and a large number of inter-connection relationships among the controls. Therefore, the connecting lines among the controls are easily overlapped with the controls, making user operation difficult. Meanwhile, in the case of many canvas pixels, the search space is very large and the search time is very long, which affect the real-time operation and experience of clients. The present invention is intended to automatically optimize obstacle avoidance of a connecting line of graphical programming to avoid the situations of disordered layout, such as overlapping and the like. The optimization method can also meet the instantaneity requirements and improve the programming experience.

BRIEF DESCRIPTION OF THE SEVERAL VIEWS OF THE DRAWINGS

FIG. 1 is a flow diagram of an automatic obstacle avoidance optimization method for a connecting line of graphical programming software in an embodiment.

DESCRIPTION OF SPECIFIC EMBODIMENTS OF THE INVENTION

The embodiment of the present invention is further described below with reference to the drawing, but the implementation of the present invention is not limited to the embodiment.

As shown in FIG. 1, an automatic obstacle avoidance optimization method for a connecting line of graphical programming software comprises the following steps of:

(a) selecting, by a user, a starting point and an end point of a connecting line through a front-end interface, wherein the starting point, the end point and a vertex of a programming control form a point set P, abscissa values in P form a set $P_x$, and ordinate values form a set $P_y$;

(b) performing drawing contraction on a canvas: taking continuous abscissa values not belonging to $P_x$ as an equivalent abscissa, and similarly, taking continuous ordinate values not belonging to $P_y$ as an equivalent ordinate, wherein, in the canvas after drawing contraction, the equivalent coordinate values are taken as the same coordinate, which greatly reduces a search space, and the operation establishes a mapping relationship between the coordinate values in the original canvas and the canvas after drawing contraction;

(c) searching the canvas after drawing contraction in four directions of the coordinate, and recording a search source of each point for restoring a path;

(d) restoring the search path according to the search source to obtain a search result which is namely a connecting line;

(e) mapping the search result obtained in the step (d) to the original canvas; and (f) regulating the connecting line obtained in the step (e): performing translational regulation on each line segment in a vertical direction thereof to regulate a distance between the line segment and the programming control.

In the step (a), the user is allowed to click a line connection button in the programming control with a mouse and finish the line connection operation by moving the mouse to an end point button of the connecting line of a module.

The step (b) comprises the following steps of:

(b-1) analyzing all programming controls, starting points and end points, and extracting all abscissa values X and all ordinate values Y;

(b-2) respectively sorting X and Y according to a magnitude to obtain X and Y sorted from small to large;

(b-3) mapping an X' and a Y' for each X and Y, X' and Y' respectively representing coordinate values of X and Y in the canvas after drawing contraction, and establishing a mapping relationship between X and X' and between Y and Y';

(b-4) if $X_{i+1}-X_i>1$ in X, inserting an $X_{i+1}$ between $X_{i+1}$ and $X_i$, and processing Y in the same way; and (b-5) mapping an X'(Y') for each X(Y), and establishing a mapping relationship.

In the step (c), a range of a new canvas, mapping relationships of the starting point and the end point on the new canvas, and a mapping relationship of each vertex of each rectangle on the new canvas can be obtained through the step (b). The new canvas can be obtained through the range and the mapping relationships. Searching will be carried out in the canvas after drawing contraction in the step (c), which comprises:

(c-1) initializing an empty queue Q;

(c-2) placing the starting point in Q and marking the starting point as an accessed point; and (c-3) taking out a head element p from Q every time, and searching in an x positive direction, an x negative direction, a y positive direction and a y negative direction of the element p; inserting a searched point into the queue from an end of the queue, and when a point p' is searched every time, marking p' as an accessed point and recording a search source of p' as p; and once the search in each direction encounters an obstacle or the accessed point, stopping the search in the direction.

In the step (d), the end point of the connecting line can be finally searched through the method above, and the search is finished at the time. A connecting line path is constructed according to the search source of each point, and the connecting line path is the optimal connecting line path after drawing contraction.

In the step (e), the search result is restored to the original canvas according to the mapping relationship obtained in the step (b), which is namely restoring each point in the ordered point set in the step (d) to the point in the original canvas according to the mapping relationship.

The operation of the step (f) is performed on each line segment excluding the starting point and the end point, which specifically comprises: using a bisection method to find the programming controls closest to the line segment on the two sides of the line segment, preprocessing firstly by dividing all rectangular edges into two groups, one group being parallel to an x coordinate axis and recorded as a first group, and the other group being parallel to a y coordinate axis and recorded as a second group; sorting the two groups of edges respectively, sorting the first group according to y coordinate values of the edges from small to large, and sorting the second group according to x coordinate values of the edges from small to large; and for one line segment, finding programming controls closest to the line segment on two sides of the line segment, which can be then converted to find edges of the programming controls closest to the line segment on the two sides, so that quick finding can be implemented in the sorted edges by using the bisection method.

What is claimed is:

1. An automatic obstacle avoidance optimization method for a connecting line of graphical programming software, comprising the following steps of:
    (a) selecting, by a user, a starting point and an end point of a connecting line through a front-end interface, wherein the starting point, the end point and a vertex of a programming control form a point set P, abscissa values in P form a set $P_x$, and ordinate values form a set $P_y$;
    (b) performing drawing contraction on a canvas: taking continuous abscissa values not belonging to $P_x$ as an equivalent abscissa, and similarly, taking continuous ordinate values not belonging to $P_y$ as an equivalent ordinate, wherein, in the canvas after drawing contraction, equivalent coordinate values are taken as a same coordinate, which greatly reduces a search space, and the operation establishes a mapping relationship between the coordinate values in the original canvas and the canvas after drawing contraction;
    (c) searching the canvas after drawing contraction in four directions of the coordinate, and recording a search source of each point for restoring a path;
    (d) restoring the search path according to the search source to obtain a search result which is namely a connecting line;
    (e) mapping the search result obtained in the step (d) to the original canvas; and
    (f) regulating the connecting line obtained in the step (e): performing translational regulation on each line segment in a vertical direction thereof to regulate a distance between the line segment and the programming control,
    wherein the step (f) comprises the following step of:
    circularly performing the following operations on each line segment excluding the starting point and the end point: finding programming controls closest to the line segment on two sides of the line segment, and translating the line segment to a middle position of the two programming controls,
    wherein the performing the following operations on each line segment in the step (f) specifically comprises: using a bisection method to find the programming controls closest to the line segment on the two sides of the line segment, preprocessing firstly by dividing all rectangular edges into two groups, one group being parallel to an x coordinate axis and recorded as a first group, and the other group being parallel to a y coordinate axis and recorded as a second group; sorting the two groups of edges respectively, sorting the first group according to y coordinate values of the edges from small to large, and sorting the second group according to x coordinate values of the edges from small to large; and for one line segment, finding programming controls closest to the line segment on two sides of the line segment, which is then converted to find edges of the programming controls closest to the line segment on the two sides, so that quick finding can be implemented in the sorted edges by using the bisection method.

2. The automatic obstacle avoidance optimization method for a connecting line of graphical programming software according to claim 1, wherein the step (b) comprises the following steps of:
    (b-1) analyzing all programming controls, starting points and end points, and extracting all abscissa values X and all ordinate values Y;
    (b-2) respectively sorting X and Y according to a magnitude to obtain X and Y sorted from small to large;
    (b-3) mapping an X' and a Y' for each X and Y, X' and Y' respectively representing coordinate values of X and Y in the canvas after drawing contraction, and establishing a mapping relationship between X and X' and between Y and Y';
    (b-4) if $X_{i+1}-X_i>1$ in X, inserting an $X_{i+1}$ between $X_{i+1}$ and $X_i$, and processing Y in the same way; and
    (b-5) mapping an X'(Y') for each X(Y), and establishing a mapping relationship.

3. The automatic obstacle avoidance optimization method for a connecting line of graphical programming software according to claim 1, wherein the step (c) comprises the following steps of:
    (c-1) initializing an empty queue Q;
    (c-2) placing the starting point in Q and marking the starting point as an accessed point; and
    (c-3) taking out a head element p from Q every time, and searching in an x positive direction, an x negative direction, a y positive direction and a y negative direction of the element p; inserting a searched point into the queue from an end of the queue, and when a point p' is searched every time, marking p' as an accessed point and recording a search source of p' as p; and once the search in each direction encounters an obstacle or the accessed point, stopping the search in the direction.

4. The automatic obstacle avoidance optimization method for a connecting line of graphical programming software according to claim 3, wherein in the step (d), the end point of the connecting line can be finally searched through the search process of the step (c), and the search is finished at the time; and a connecting line path is constructed according to the search source of each point, and the connecting line path is the optimal connecting line path after drawing contraction.

5. The automatic obstacle avoidance optimization method for a connecting line of graphical programming software according to claim 1, wherein in the step (e), the search result obtained in the step (d) is restored to the original canvas according to the mapping relationship obtained in the step (b).

* * * * *